United States Patent
Koros et al.

(10) Patent No.: US 9,527,045 B2
(45) Date of Patent: Dec. 27, 2016

(54) CARBON MOLECULAR SIEVE MEMBRANES MADE FROM 6FDA AND DETDA-BASED PRECURSOR POLYMERS

(71) Applicants: L'Air Liquide, Societe Anonyme pour l'Etude et Exploitation des Procedes Georges Claude, Paris (FR); Georgia Tech Research Corporation, Atlanta, GA (US)

(72) Inventors: William J. Koros, Atlanta, GA (US); Shilu Fu, Atlanta, GA (US); Edgar S. Sanders, Jr., Newark, DE (US); Sudhir S. Kulkarni, Wilmington, DE (US)

(73) Assignees: L'Air Liquide Société Anonyme pour l'Étude et l'Exploitation des Procedes Georges Claude, Paris (FR); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 14/581,167

(22) Filed: Dec. 23, 2014

(65) Prior Publication Data

US 2015/0182921 A1     Jul. 2, 2015

Related U.S. Application Data

(60) Provisional application No. 61/920,886, filed on Dec. 26, 2013.

(51) Int. Cl.
    *B01D 71/02*     (2006.01)
    *B01D 69/06*     (2006.01)
    *B01D 67/00*     (2006.01)
    *B01D 53/22*     (2006.01)
    *B01D 71/64*     (2006.01)

(52) U.S. Cl.
    CPC ......... *B01D 71/028* (2013.01); *B01D 67/0067* (2013.01); *B01D 69/06* (2013.01); *B01D 71/021* (2013.01); *B01D 53/228* (2013.01); *B01D 71/64* (2013.01); *B01D 2323/12* (2013.01); *B01D 2323/14* (2013.01); *B01D 2325/027* (2013.01)

(58) Field of Classification Search
CPC ... B01D 53/228; B01D 67/0067; B01D 69/06; B01D 71/021; B01D 71/028; B01D 71/64; B01D 2323/12; B01D 2323/14; B01D 2325/027
USPC .............................................................. 96/4
See application file for complete search history.

(56) References Cited

U.S. PATENT DOCUMENTS

| | | | |
|---|---|---|---|
| 4,127,625 A | 11/1978 | Arisaka et al. | |
| 4,705,540 A * | 11/1987 | Hayes ................. | B01D 71/64 95/51 |
| 4,717,394 A | 1/1988 | Hayes | |
| 4,932,982 A | 6/1990 | Hayes | |
| 4,981,497 A | 1/1991 | Hayes | |
| 5,015,270 A | 5/1991 | Ekiner et al. | |
| 5,102,600 A | 4/1992 | Ekiner et al. | |
| 5,618,334 A | 4/1997 | Ozcayir et al. | |
| 5,799,960 A | 9/1998 | Davis, Sr. | |
| 5,928,410 A | 7/1999 | Jois et al. | |
| 5,939,520 A | 8/1999 | Langsam | |
| 6,299,669 B1 * | 10/2001 | Koros ................. | B01D 53/228 95/51 |
| 6,565,631 B2 | 5/2003 | Koros et al. | |
| 2002/0153315 A1 | 10/2002 | Koros et al. | |
| 2005/0235825 A1 * | 10/2005 | Tin ...................... | B01D 53/228 95/45 |
| 2011/0100211 A1 * | 5/2011 | Kiyono ............... | B01D 53/228 95/45 |
| 2011/0138852 A1 | 6/2011 | Hasse et al. | |

FOREIGN PATENT DOCUMENTS

| | | |
|---|---|---|
| EP | 0 290 962 | 11/1988 |
| WO | WO 03/053547 | 7/2003 |
| WO | WO 2011/053403 | 5/2011 |
| WO | WO 2011/109607 | 9/2011 |
| WO | WO 2012/148563 | 11/2012 |
| WO | WO 2013/095775 | 6/2013 |
| WO | WO 2013/165866 | 11/2013 |

OTHER PUBLICATIONS

Xu, Liren et al., "Olefins-selective asymmetric carbon molecular sieve hollow fiber membranes for hybrid membrane-distillation processes for olefin/paraffin separations", Journal of Membrane Science, 423-424, 2012, pp. 314-323.*

Kim, Youn Kook et al., "The gas separation properties of carbon molecular sieve membranes derived from polyimides having carboxylic acid groups", Journal of Membrane Science, 235, 2004, pp. 139-146.*

Fuertes, et al., "Carbon composite membranes from Matrimid and Kapton polyimides for gas separation," Microporous and Mesoporous Materials, 33 (1999), 115-125.

Ebner, et al., "State-of-the-art Adsorption and Membrane Separation Processes for Carbon Dioxide Production from Carbon Dioxide Emitting Industries," Separation Science and Technology, 44: 6, 1273-1421. 2009.

Hayashi, et al., "Separation of Ethane/Ethylene and Propane/Propylene Systems with a Carbonized BPDA-pp'ODA Polyimide Membrane," Ind. Eng. Chem. Res. 1996, 35, 4176-4181.

(Continued)

*Primary Examiner* — Jason M Greene
(74) *Attorney, Agent, or Firm* — Christopher J. Cronin

(57) ABSTRACT

A carbon molecular sieve (CMS) membrane is made by pyrolyzing a film or hollow fiber membrane made of a polyimide polymer or copolymer essentially consisting of repeating units of dianhydride-derived units and diamine-derived units. At least 50% of the dianhydride-derived units are derived from 2,2-bis(3,4-dicarboxyphenyl) hexafluoropropane (6FDA). At least 50% of the diamine-derived units are derived from 2,5-diethyl-6-methyl-1,3-diamino benzene (DETDA).

2 Claims, 2 Drawing Sheets

(56) References Cited

OTHER PUBLICATIONS

Hosseini, et al., "Carbon membranes from blends of PBI and polyimides for N2/CH4 and CO2/CH4 separation and hydrogen purification," Journal of Membrane Science, 328 (2009), 174-185.

Kim, et al, "The gas separation properties of carbon molecular sieve membranes derived from polyimides having carboxylic acid groups," Journal of Membrane Science, 235 (2004), 139-146.

Kiyono, et al., "Effect of pyrolysis atmosphere on separation performance of carbon molecular sieve membranes," Journal of Membrane Science, 359 (2010), 2-10.

Low, et al., "Carbon molecular sieve membranes derived from pseudo-interpenetrating polymer networks for gas separation and carbon capture," Carbon, 49 (2011), 2104-2112.

Park, et al., "Relationship between chemical structure of aromatic polyimides and gas permeation properties of their carbon molecular sieve membranes," Journal of Membrane Science, 229 (2004), 117-127.

Shao, et al., "Casting solvent effects on morphologies, gas transport properties of a novel 6FDA/PMDA-TMMDA copolyimide membrane and its derived carbon membranes," Journal of Membrane Science, 244 (2004), 77-87.

Swaidan, et al., "High Pressure Pure- and Mixed-Gas Separation of CO2/CH4 by Thermally-Rearranged and Carbon Molecular Sieve Membranes Derived from a Polyimide of Intrinsic Microporosity," Journal of Membrane Science, http://dx.doi.org/10.1016/j.memsci.2013.07.057.

Tin, et al., "Separation of CO2/CH4 through carbon molecular sieve membranes derived from P84 polyimide," Carbon, 42 (2004), 3123-3131.

Vaughn, et al., "Effect of thermal annealing on a novel polyamide-imide polymer membrane for aggressive acid gas separations," Journal of Membrane Science, 401-402, (2012), 163-174.

Vu, et al., "High Pressure CO2/CH4 Separation Using Carbon Molecular Sieve Hollow Fiber Membranes," Ind. Eng. Chem. Res. 2002, 41, 367-380.

Xu, et al., "Olefins-selective asymmetric carbon molecular sieve hollow fiber membranes for hybrid membrane-distillation processes for olefin/paraffin separations," Journal of Membrane Science, 423-424, (2012), 314-323.

Yoshino, et al., "Olefin/paraffin separation performance of carbonized membranes derived from an asymmetric hollow fiber membrane of 6FDA/BPDA-DDBT copolyimide," Journal of Membrane Science, 215, (2003), 169-183.

Clausi, et al., "Formation of defect-free polyimide hollow fiber membranes for gas separations," Journal of Membrane Science, 167, (2000), 79-89.

Koresh, et al., "Molecular Sieve Carbon Permselective Membrane. Part 1. Presentation of a New Device for Gas Mixture Separation," Separation Science and Technology, 18(8), pp. 723-734, 1983.

Huertas, et al., "Thermal degradation of crosslinked copolyimide membrane to obtain productive gas separation membranes," Polymer Degradation and Stability, 98 (3), pp. 743-750, 2012.

Kiyono, et al., "Effect of polymer precursors on carbon molecular sieve structure and separation performance properties," Carbon 48 (15), pp. 4432-4441, 2010.

Qiu, et al., "Gas separation performance of 6FDA-based polyimides with different chemical structures," Polymer 54 (2013) pp. 6226-6235.

Qiu, et al., "Gas separation performance of carbon molecular sieve membranes based on 6FDA-mPDA-DABA 3-2 Polyimide," ChemSusChem 2014, 7, pp. 1186-1194.

Qiu, et al., "Sub-Tg Cross-Linking of a Polyimide Membrane for Enhanced CO2 Plasticization Resistance for Natural Gas Separation," Macromolecules 2011, 44, pp. 6046-6056.

Qiu, et al., "Thermal analysis and its application in evaluation of fluorinated polyimide membranes for gas separation," Polymer 52, 2011, pp. 4073-4082.

International Search Report and Written Opinion for PCT/US2014/071475, mailed Mar. 20, 2015.

* cited by examiner

CARBON MOLECULAR SIEVE MEMBRANES MADE FROM 6FDA AND DETDA-BASED PRECURSOR POLYMERS

CROSS-REFERENCE TO RELATED APPLICATIONS

This patent application claims the benefit of U.S. Provisional Patent Application No. 61/920,886 filed Dec. 26, 2013, the disclosure of which is incorporated herein by reference.

BACKGROUND

Field of the Invention

The present invention relates to carbon molecular sieve membranes and gas separations utilizing the same.

Related Art

Membranes are viewed as selective barriers between two phases. Due to the random thermal fluctuations within the polymer matrix, gas molecules from the high partial pressure side sorb into the membrane and diffuse through under the influence of a chemical potential gradient, and finally desorb to the low partial pressure side. Two terms, "permeability" and "selectivity", are used to describe the most important properties of membranes-productivity and separation efficiency respectively. Permeability (P) equals the pressure and thickness normalized flux, as shown in the following equation:

$$P_i = \frac{n_i \cdot l}{\Delta p_i} \quad (1)$$

where $n_i$ is the penetrant flux through the membrane of thickness (l) under a partial pressure ($\Delta p_i$). The most frequently used unit for permeability, Barrer, is defined as below:

$$\text{Barrer} = 10^{-10} \frac{cc(STP) \cdot cm}{cm^2 \cdot s \cdot cmHg} \quad (2)$$

Selectivity is a measure of the ability of one gas to flow through the membrane over that of another gas. When the downstream pressure is negligible, the ideal selectivity (based upon the permeabilities of pure gases) of the membrane, can be used to approximate the real selectivity (based upon the permeabilities of the gases in a gas mixture). In this case, the selectivity ($\alpha_{A/B}$) is the permeability of a first gas A divided by the permeability of a second gas B.

Currently, polymeric membranes are well studied and widely available for gaseous separations due to easy processability and low cost. In particular, polyimides have high glass transition temperatures, are easy to process, and have one of the highest separation performance properties among other polymeric membranes. The patent literature (including US 2011/138852; U.S. Pat. No. 5,618,334; U.S. Pat. No. 5,928,410; and U.S. Pat. No. 4,981,497) discloses one particular class of polyimides for use in polymeric gas separation membranes that is based upon the reaction of a diamine(s) with 2,2-bis(3,4-dicarboxyphenyl) hexafluoropropane dianhydride (6FDA).

The selectivities of carbon molecular sieve (CMS) membranes, however, have been shown to have attractive separation performance properties exceeding those of polymeric membranes.

CMS membranes are typically produced through thermal pyrolysis of polymer precursors. For example, it is known that defect-free hollow fiber CMS membranes can be produced by pyrolyzing cellulose hollow fibers (J. E. Koresh and A. Soffer, Molecular sieve permselective membrane. Part I. Presentation of a new device for gas mixture separation. *Separation Science and Technology*, 18, 8 (1983)). In addition, many other polymers have been used to produce CMS membranes in fiber and dense film form, among which polyimides have been favored.

CMS membranes have also been produced from a wide variety of 6FDA-based polyimide precursors including the following specific examples.

Shao, et al. disclosed that gas separation performance of CMS membranes (films) pyrolyzed from different morphological precursors is strongly dependent on pyrolysis temperature (Shao, et al., Journal of Membrane Science 244 (2004) 77-87). The tested CMS membranes included those based upon 6FDA/PMDA-TMMDA and 6FDA-TMMDA, where PMDA is pyromellitic dianhydride, and TMMDA is tetramethylmethylenedianiline.

Low, et al. disclosed CMS membranes (films) pyrolized from pseudo-Interpenetrating networks formed from 6FDA-TMPDA polyimide and azide, where TMPDA is 2,3,5,6-Tetramethyl-1,4-phenylenediamine (Low, et al., Carbon molecular sieve membranes derived from pseudo-interpenetrating polymer networks for gas separation and carbon capture, Carbon 49 (2011) 2104-2112).

Swaidan, at al. disclosed the study of CH4/CO2 separations using thermally rearranged membranes and CMS membranes (films) pyrolyzed from polyimides based upon 6FDA and 3,3,3',3'-tetramethyl-1,1'-spirobisindane-5,5'-diamino-6,6'-diol (Swaidan, et al., available online, accepted for publication on Jul. 28, 2013).

Kiyono, et al. disclosed the effect of pyrolysis atmosphere upon the performance of CMS membranes (films) pyrolyzed from 6FDA/BPDA-DAM, where DAM is 2,4,6-trimethyl-1,3-phenylene diamine and BPDA is 3,3,4,4-biphenyl tetracarboxylic dianhydride (Kiyono, et al., Effect of pyrolysis atmosphere on separation performance of carbon molecular sieve membranes, Journal of Membrane Science 359 (2010) 2-10).

Xu, at al. disclosed CMS membranes (hollow fibers) pyrolyzed from polyimides based upon BTDA-DAPI (Matrimid® 5218), 6FDA-DAM, and 6FDA/BPDA-DAM, where BTDA is 3,3',4,4'-benzophenone tetracarboxylic dianhydride, DAPI is diaminophenylindane, DAM is 2,4,6-trimethyl-1,3-phenylene diamine. and BPDA is 3,3,4,4-biphenyl tetracarboxylic dianhydride (Xu, et al., Olefins-selective asymmetric carbon molecular sieve hollow fiber membranes for hybrid membrane-distillation processes for olefin/paraffin separations, Journal of Membrane Science 423-424 (2012) 314-323).

Fuertes, et al. disclosed the preparation and characterization of CMS membranes (films) pyrolyzed from Matrimid® and Kapton®, where Kapton® is a polyimide based upon pyromellitic dianhydride and 4,4'-oxydiphenylamine (Fuertes, et al., Carbon composite membranes from Matrimid® and Kapton® polyimides for gas separation, Microporous and Mesoporous Materials 33 (1999) 115-125).

Tin, et al. studied the permeation of $CO_2$ and $CH_4$ with CMS membranes (films) pyrolyzed from P84 polyimide based BTDA-TDI/MDI, where tetracarboxylic dianhydride and MDI is 80% methylphenylene-diamine+20% methylene diamine (Tin, et al., Separation of $CO_2$/$CH_4$ through carbon molecular sieve membranes derived from P84 polyimide, Carbon 42 (2004) 3123-3131).

Park, et al. studied the effect of different numbers of methyl substituent groups on block copolymides (PI-X) used to formulate CMS membranes (films). The block copolymides included those based upon BTDA-ODA/m-PDA, BTDA-ODA/2,4-DAT, and BTDA-ODA/m-TMPD, where ODA is 4,4-oxydianilne, m-PDA is 1,3-Phenylenediamine and 2,4-DAT is 2,4-diaminotoluene (Park, et al., Relationship between chemical structure of aromatic polyimides and gas permeation properties of their carbon molecular sieve membranes, Journal of Membrane Science 229 (2004) 117-127).

Hosseini, et al. compared the performance of CMS membranes pyrolyzed from each of Torlon (a polyamide-imide), P84, or Matrimid alone, and also in binary blends with polybenzimidazole (PIB), where Torlon (Hosseini, et al., Carbon membranes from blends of PBI and polyimides for $N_2/CH_4$ and $CO_2/CH_4$ separation and hydrogen purification, Journal of Membrane Science 328 (2009) 174-185).

Yoshino, et al. disclosed the separation of olefins/paraffins using a CMS membrane (hollow fiber) pyrolyzed from a polyimide based upon 6FDA/BPDA-DDBT, where DDBT is 3,7-diamino-2,8(6)-dimethyldibenzothiophene sulfone (Yoshino, et al., Olefin/paraffin separation performance of carbonized membranes derived from an asymmetric hollow fiber membrane of 6FDA/BPDA-DDBT copolyimide, Journal of Membrane Science 215 (2003) 169-183).

SUMMARY

There is disclosed a method for producing a carbon molecular sieve (CMS) membrane that includes the following steps. Films or hollow fibers made of a polyimide polymer or copolymer are formed to produce a precursor membrane. The precursor membrane is pyrolized under conditions sufficient to form a CMS membrane. The polyimide polymer or copolymer essentially consists of repeating units of dianhydride-derived units and diamine-derived units, each dianhydride-derived unit being either the dianhydride-derived moiety of formula (I) or the dianhydride-derived moiety of formula (II):

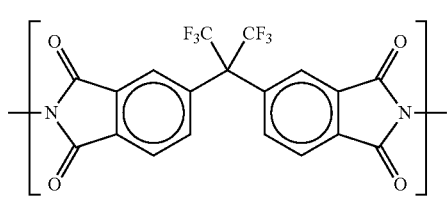
(I)

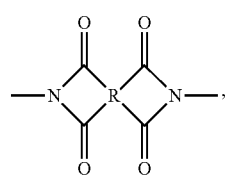
(II)

wherein:

each R is a molecular segment independently selected from the group consisting of formula (1), formula (2), formula (3), and formula (4):

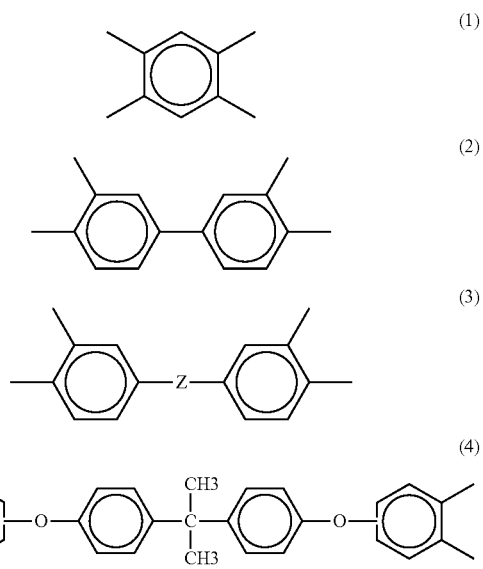

Each Z is a molecular segment independently selected from the group consisting of formula (5), formula (6), formula (7), formula (8), and formula (9).

(5)

(6)

(7)

(8)

(9)

Each diamine-derived unit is a diamine-derived moiety independently selected from the group consisting of formula (A), formula (B), formula (C), formula (D), formula (E), formula (F), formula (G), and formula (H):

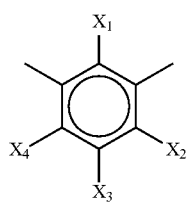
(A)

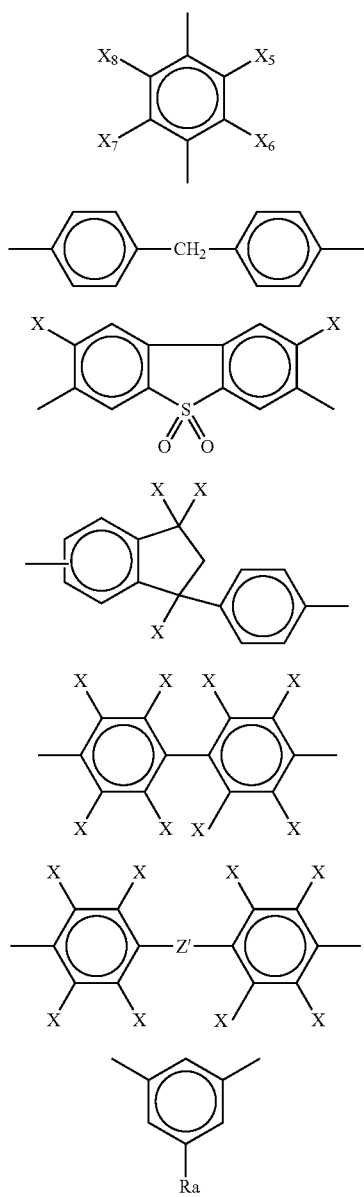

(B)

(C)

(D)

(E)

(F)

(G)

(H)

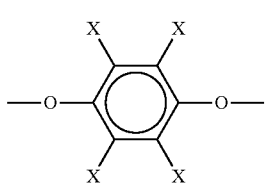

Each X, $X_1$, $X_2$, $X_3$, $X_4$, $X_5$, $X_6$, $X_7$, and $X_8$ is independently selected from the group consisting of hydrogen, an aromatic group, and a straight or branched $C_1$ to $C_6$ alkyl group. Each $R_a$ is a straight or branched $C_1$ to $C_6$ alkyl group having either a terminal hydroxyl group, a terminal carboxylic acid group, or a terminal carbon to carbon double bond. Each Z' is a molecular segment selected from the group consisting of formula (a), formula (b), formula (c), and formula (d):

(A)

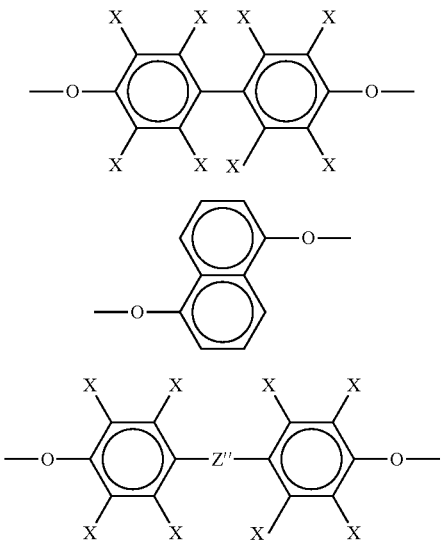

(b)

(c)

(d)

Each Z" is a moiety selected from the group consisting of formula (U) and formula (V):

(U)

(V)

Each $X_9$ is selected from the group consisting of hydrogen, a straight or branched alkyl group having 1 to 6 carbon atoms, and a straight or branched pefluoroalkyl group having 1 to 6 carbon atoms. At least 50% of the dianhydride-derived units are the dianhydride-derived moiety of formula (I). At least 50% of the diamine-derived units are the diamine-derived moiety of formula (A) or the diamine-derived moiety of formula (B). In the case of at least 50% of the diamine-derived units being the diamine-derived moiety of formula (A), at least one of $X_1$, $X_2$, and $X_4$ is a $C_2$ to $C_6$ straight or branched alkyl or aromatic group. In the case of at least 50% of the diamine-derived units being the diamine-derived moiety of formula (B), at least one of $X_5$, $X_6$, $X_7$, and $X_8$ is a $C_2$ to $C_6$ straight or branched alkyl group or aromatic group.

There is also disclosed a CMS membrane that is made according to the above method.

The method and/or the CMS membrane may include one or more of the following aspects:

100% of the diamine-derived units are the diamine-derived moiety of formula (A) and 100% of the dianhydride-derived units are the dianhydride-derived moiety of formula (I).

$X_1$ and $X_3$ are ethyl groups, $X_2$ is a methyl group and $X_4$ is H.

100% of the diamine-derived units are the diamine-derived moiety of formula (B) and 100% of the dianhydride-derived units are the dianhydride-derived moiety of formula (I).

100% of the diamine-derived units are the diamine-derived moiety of formula (A) and at least 50% but not all of the dianhydride-derived units are the dianhydride-derived moiety of formula (I) with a balance of the dianhydride-derived units being the dianhydride-derived moiety of formula (II).

$X_1$ and $X_3$ are ethyl groups, $X_2$ is a methyl group and $X_4$ is H.

R is the molecular segment of formula (2).

$X_1$ and $X_3$ are ethyl groups, $X_2$ is a methyl group and $X_4$ is H.

R is the molecular segment of formula (3) wherein Z is the molecular segment of formula (5).

$X_1$ and $X_3$ are ethyl groups, $X_2$ is a methyl group and $X_4$ is H.

100% of the diamine-derived units are the diamine-derived moiety of formula (B) and at least 50% but not all of the dianhydride-derived units are the dianhydride-derived moiety of formula (I) with a balance of the dianhydride-derived units being the dianhydride-derived moiety of formula (II).

R is the molecular segment of formula (2).

R is the molecular segment of formula (3) where Z is the molecular segment of formula (5).

100% of the dianhydride-derived units are the dianhydride-derived moiety of formula (I) and at least 50% but not all of the diamine-derived units are the diamine-derived moiety of formula (A) with the balance of the diamine-derived units being the diamine-derived moiety of either formula (C), formula (D), formula (E), formula (F), formula (G), or formula (H).

$X_1$ and $X_3$ are ethyl groups, $X_2$ is a methyl group and $X_4$ is H.

the balance of the diamine-derived units are the diamine-derived moiety of formula (H) where $R_a$ is a —COOH group.

$X_1$ and $X_3$ are ethyl groups, $X_2$ is a methyl group and $X_4$ is H.

100% of the dianhydride-derived units are the dianhydride-derived moiety of formula (I); at least 50% but not all of the diamine-derived units are the diamine-derived moiety of formula (A); and the balance of the diamine-derived units being the diamine-derived moiety of formula (B) where $X_5$, $X_6$, $X_7$, and $X_8$ are methyl groups.

100% of the dianhydride-derived units are the dianhydride-derived moiety of formula (I); at least 50% but not all of the diamine-derived units are the diamine-derived moiety of formula (A) where $X_1$ and $X_3$ are ethyl groups, $X_2$ is a methyl group and $X_4$ is H; and the balance of the diamine-derived units being the diamine-derived moiety of formula (A) where $X_1$, $X_2$, and $X_4$ are methyl groups and $X_3$ is hydrogen.

100% of the dianhydride-derived units are the dianhydride-derived moiety of formula (I) and at least 50% but not all of the diamine-derived units are the diamine-derived moiety of formula (B) with the balance of the diamine-derived units being the diamine-derived moiety of either formula (C), formula (D), formula (E), formula (F), formula (G), or formula (H).

the balance of the diamine-derived units are the diamine-derived moiety of formula (H) where $R_1$ is a —COOH group.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
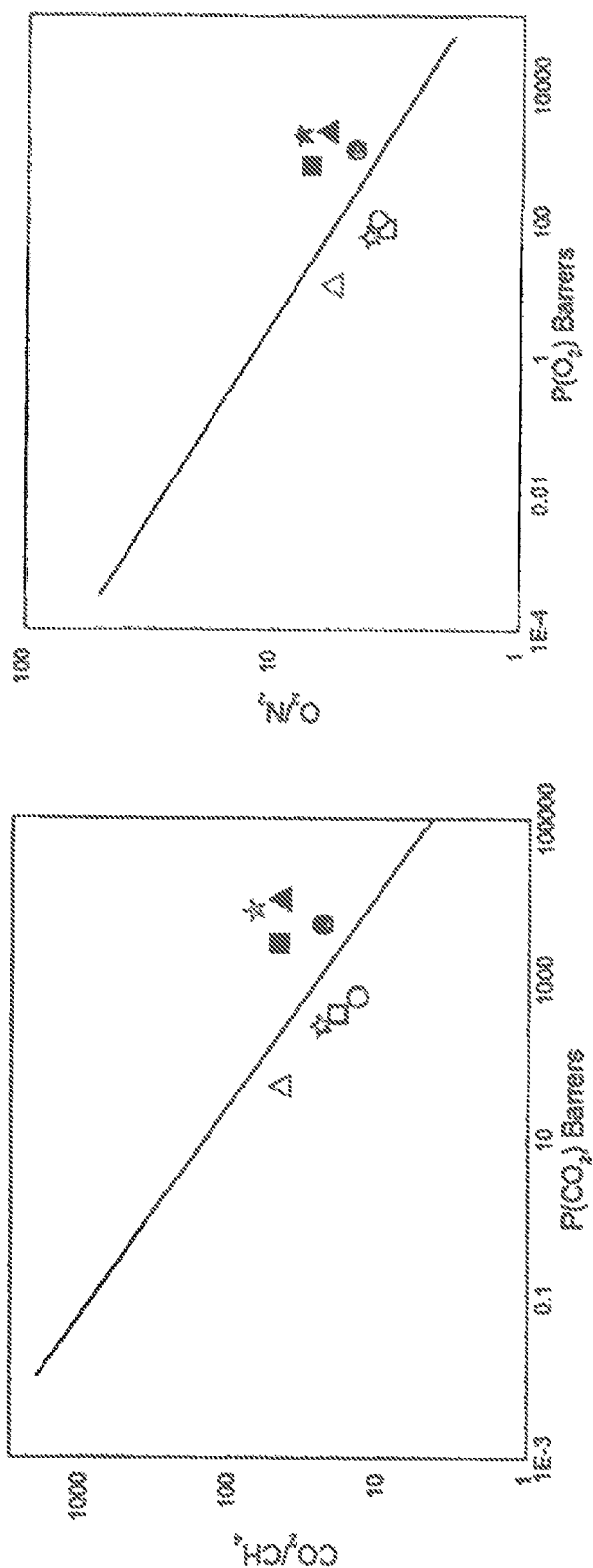
FIG. 1 graphically displays the separation performance of polymer and CMS films at 35° C. and 30 psi derived from a variety of polymers FIG. 2 graphically displays the time dependence of the gas permeability and selectivity of CMS films derived from a variety of polymers that were stored under vacuum for 25 days at 35° C.

The CMS membranes of the invention are capable of relatively high permeabilities and selectivities in various gas separations, including $CO_2/CH_4$, $O_2/N_2$, and $C_3H_6/C_3H_8$.

The CMS membrane is made by pyrolyzing a polyimide polymer or copolymer having repeating units of dianhydride-derived units and diamine-derived units. Each dianhydride-derived unit is either the dianhydride-derived moiety of formula (I) or the dianhydride-derived moiety of formula (II):

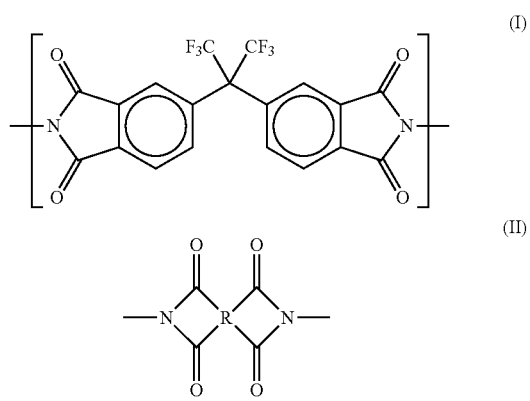

Each R is a molecular segment independently selected from the group consisting of formula (1), formula (2), formula (3), and formula (4):

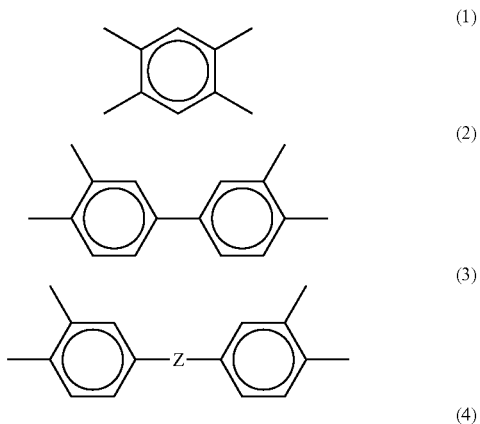

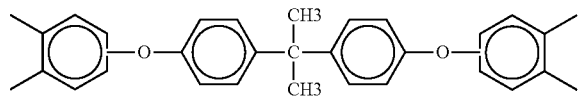

By independently selected, we mean that each R need not be the same, however, typically it is.

Each Z is a molecular segment independently selected from the group consisting of formula (5), formula (6), formula (7), formula (8), and formula (9).

(5)

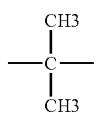
(6)

(7)

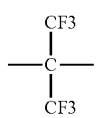
(8)

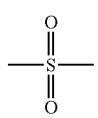
(9)

By independently selected, we mean that each Z need not be the same, however, typically it is.

Each diamine-derived unit is either a diamine-derived moiety independently selected from the group consisting of formula (A), formula (B), formula (C), formula (D), formula (E), formula (F), formula (G), and formula (H):

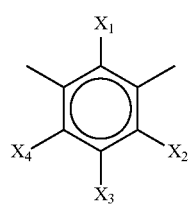
(A)

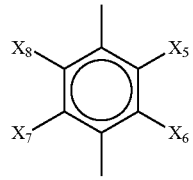
(B)

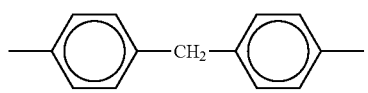
(C)

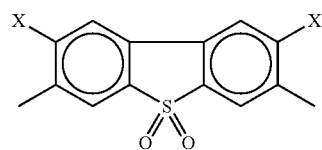
(D)

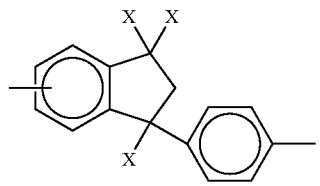
(E)

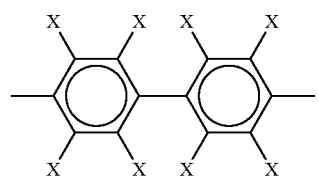
(F)

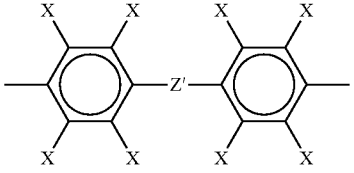
(G)

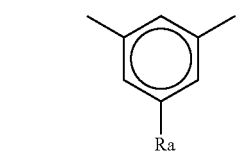
(H)

By independently selected, we mean that the diamine-derived unit need not be the same in each repeating unit. Each X, $X_1$, $X_2$, $X_3$, $X_4$, $X_5$, $X_6$, $X_7$, and $X_8$ is independently selected from the group consisting of hydrogen, an aromatic group, and a straight or branched $C_1$ to $C_6$ alkyl group. By independently selected from, we mean that each X, $X_1$, $X_2$, $X_3$, $X_4$, $X_5$, $X_6$, $X_7$, and $X_8$ need not be the same for each and every diamine-derived unit. Each $R_a$ is a straight or branched $C_1$ to $C_6$ alkyl group having either a terminal hydroxyl group, a terminal carboxylic acid group, or a terminal carbon to carbon double bond. Typically, $R_a$ is a —COOH group. The diamine-derived units of formula (H) where $R_a$ is a —COOH group is conventionally termed DABA (3,5 diamino benzoic acid). Each Z' is a molecular segment selected from the group consisting of formula (a), formula (b), formula (c), and formula (d):

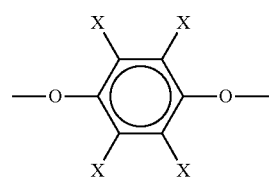
(a)

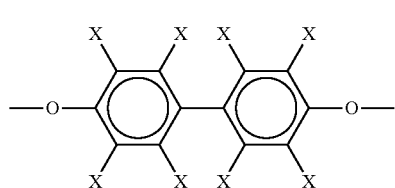
(b)

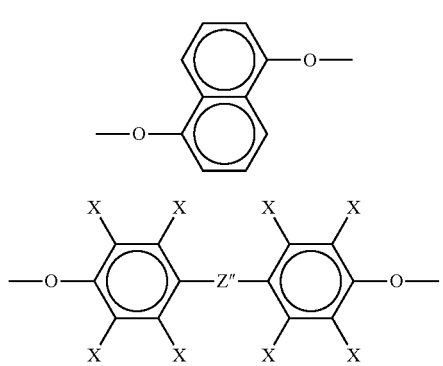

Each Z" is a moiety selected from the group consisting of formula (U) and formula (V)

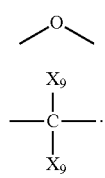

Each $X_9$ is selected from the group consisting of hydrogen, a straight or branched alkyl group having 1 to 6 carbon atoms, and a straight or branched pefluoroalkyl group having 1 to 6 carbon atoms.

The polyimide is characterized in that at least 50% of the dianhydride-derived units are the dianhydride-derived moiety of formula (I). This dianhydride-derived moiety is conventionally termed 6FDA and is derived from 2,2'-bis(3,4-dicarboxyphenyl hexafluoropropane). We believe that the 6FDA molecular segment exhibits many attractive properties. The bulky —$CF_3$ groups inhibits close packing of the chain segments, leading to better solubility and easier processability. Also, the C—F bond possesses high bond dissociation energy which enhances thermal stability of the (co)polymer. Moreover, fluorinated compounds (such as from the —$CF_3$ groups), that are produced during pyrolysis, diffuse out of the membrane. As a result, the CMS membrane exhibits higher free volume and permeability.

The polyimide is also characterized in that: at least 50% of the diamine-derived units are the diamine-derived moiety of formula (A) or the diamine-derived moiety of formula (B); and for formula (A) and/or formula (B), there is a $C_2$ to $C_6$ straight or branched alkyl group or an aromatic group that is ortho to the imide linkage. In other words, when the diamine-derived unit is the diamine-derived moiety of formula (A), at least one of $X_1$, $X_2$, and $X_4$ is a $C_2$ to $C_6$ straight or branched alkyl or aromatic group, and when the diamine-derived unit is the diamine-derived moiety of formula (B), at least one of $X_5$, $X_6$, $X_7$, and $X_8$ is a $C_2$ to $C_6$ straight or branched alkyl group or aromatic group. We believe that the presence of this bulky $C_2$ to $C_6$ alkyl group or bulky aromatic group (that is ortho to the imide linkage) sterically inhibits rotation of the polymer around the phenyl to nitrogen bond of the imide linkage. Without being bound by any particular theory, we believe that this sterically inhibited rotation renders the polyimide more rigid, leading to a desirable CMS membrane morphology and permeance. This relatively bulky group also inhibits close chain packing resulting in higher intrinsic membrane permeability and lower membrane separation system cost. Typically, $X_1$ and $X_3$ are ethyl groups, $X_2$ is a methyl group and $X_4$ is H in which case the diamine-derived unit is conventionally termed diethyl toluene diamine (DETDA). Alternatively, $X_1$ and $X_2$ are ethyl groups, $X_3$ is a methyl group, and $X_4$ is H.

In one embodiment, 100% of the diamine-derived units are the diamine-derived moiety of formula (A) and 100% of the dianhydride-derived units are the dianhydride-derived moiety of formula (I). Typically, $X_1$ and $X_3$ are ethyl groups, $X_2$ is a methyl group and $X_4$ is H.

In another embodiment, 100% of the diamine-derived units are the diamine-derived moiety of formula (B) and 100% of the dianhydride-derived units are the dianhydride-derived moiety of formula (I).

In a further embodiment, 100% of the diamine-derived units are the diamine-derived moiety of formula (A) and at least 50% but less than 100% of the dianhydride-derived units are the dianhydride-derived moiety of formula (I) with a balance of the dianhydride-derived units being the dianhydride-derived moiety of formula (II). Typically, $X_1$ and $X_3$ are ethyl groups, $X_2$ is a methyl group and $X_4$ is H. Typically, R is the molecular segment of formula (2). A ratio of the number of dianhydride-derived units of formula (I) to the number of dianhydride-derived units of formula (II) is about 1:1.

In yet another embodiment, 100% of the diamine-derived units are the diamine-derived moiety of formula (B) and at least 50% but less than 100% of the dianhydride-derived units are the dianhydride-derived moiety of formula (I) with a balance of the dianhydride-derived units being the dianhydride-derived moiety of formula (II). Typically, R is the molecular segment of formula (2).

In yet a further embodiment, 100% of the dianhydride-derived units are the dianhydride-derived moiety of formula (I) and at least 50% but less than 100% of the diamine-derived units are the diamine-derived moiety of formula (A) with the balance of the diamine-derived units being the diamine-derived moiety of either formula (C), formula (D), formula (E), formula (F), formula (G), or formula (H). Typically, $X_1$ and $X_3$ are ethyl groups, $X_2$ is a methyl group and $X_4$ is H. Typically, the balance of the diamine-derived units are the diamine-derived moiety of formula (H) where $R_a$ is a —COOH group. A ratio of the number of the diamine-derived units of formula (A) to the number of the diamine-derived units of formula (H) is typically about 3:2.

In yet one more embodiment, 100% of the dianhydride-derived units are the dianhydride-derived moiety of formula (I) and at least 50% but less than 100% of the diamine-derived units are the diamine-derived moiety of formula (B) with the balance of the diamine-derived units being the diamine-derived moiety of either formula (C), formula (D), formula (E), formula (F), formula (G), or formula (H). Typically, the balance of the diamine-derived units are the diamine-derived moiety of formula (H) where $R_1$ is a —COOH group.

The polyimide polymer or copolymer may be synthesized by reacting, in any one of a wide variety of known polyimide synthesis methods, stoichiometric amounts of one or more dianhydrides and one or more diamines to form the intermediate poly(amic acid) followed by removal of water to form the polyimide by ring-closing. The skilled artisan will understand that a stoichiometric amount of a dianhydride reacted with a stoichiometric amount of a mixture of diamines will result in a random copolymer. Alternatively, a block copolymer of the dianhydride and one or more diamines may be synthesized according to known methods in which case the diamines are not initially in admixture. The skilled artisan will similarly understand that a stoichiometric amount of a mixture of dianhydrides reacted with a stoichiometric amount of a diamine will also form a random copolymer and that a block copolymer may alternatively be synthesized according to known methods in which case the dianhydrides are not initially in admixture. Finally, the skilled artisan will further understand that a stoichiometric amount of a mixture of dianhydrides reacted with a stoichiometric amount of a mixture of diamines will result in a random polymer and that a block copolymer may alternatively be synthesized according to known methods in which case the dianhydrides are not initially in admixture and the diamines are not initially in admixture.

At least 50% and as much as 100% of the dianhydride is 2,2'-bis(3,4-dicarboxyphenyl hexafluoropropane) which conventionally termed 6FDA and whose molecular structure is shown by formula I':

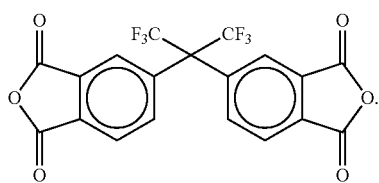

When less than 100% of the dianhydride is 6FDA, the balance of the dianhydride is shown by formula II':

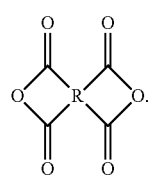

Each R is as defined above. Typically, the balance of the dianhydride is 3,3',4,4'-biphenyl tetracarboxylic dianhydride (BPDA) or -3,3',4,4'-benzophenone tetracarboxylic dianhydride (BTDA):

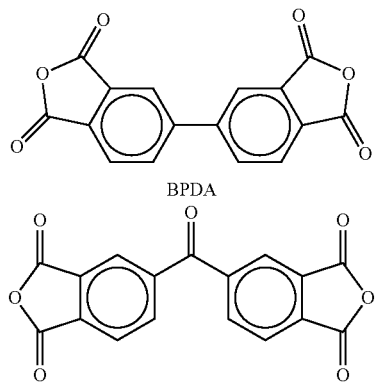

At least 50% and as much as 100% of the diamine(s) is a phenyldiamine having the structure according to either formulae (A') or (B'):

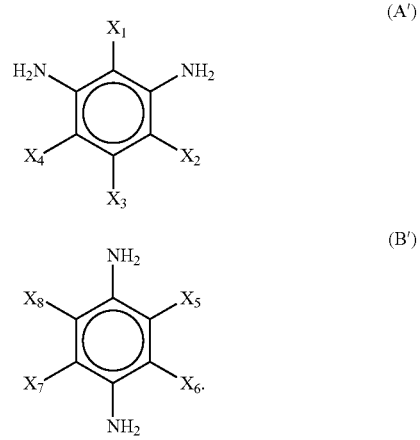

For the phenyldiamine of formula (A'), each of $X_1$, $X_2$, $X_3$, and $X_4$ is independently hydrogen, an aromatic group, or a straight or branched $C_1$ to $C_6$ alkyl group with the proviso that at least one of $X_1$, $X_2$, or $X_4$ is an aromatic group or a straight or branched $C_2$ to $C_6$ alkyl group that ultimately becomes the bulky group ortho to the imide linkage upon reaction of the dianhydride(s) and diamine(s). Typically, $X_1$ and $X_3$ are ethyl groups, $X_2$ is a methyl group and $X_4$ is H. Alternatively, $X_1$ and $X_2$ are ethyl groups, $X_3$ is a methyl group, and $X_4$ is H. These alternative phenyldiamines of formula (A') are commonly referred as diethyttoluenediamine. More typically, at least 50% and as much as 100% of the diamine(s) is 2,5-dlethyl-6-methyl-1,3-diamino benzene (DETDA):

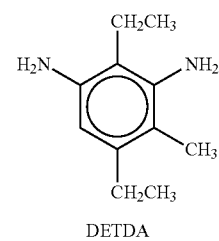

DETDA

For the phenyldiamine of formula (B'), each of $X_5$, $X_6$, $X_7$, and $X_8$ is independently hydrogen, an aromatic group, or a straight or branched $C_1$ to $C_6$ alkyl group with the proviso that at least one of $X_5$, $X_6$, $X_7$, and $X_8$ is an aromatic group or a straight or branched $C_2$ to $C_6$ alkyl group that ultimately becomes the bulky group ortho to the imide linkage upon reaction of the dianhydride(s) and diamine(s). When less than 100% of the diamine is the diamine of formula (A') or formula (B'), the balance of the diamine is either DETDA or a diamine independently selected from the group consisting of formula (C'), formula (D'), formula (E'), formula (F'), and

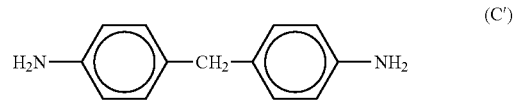

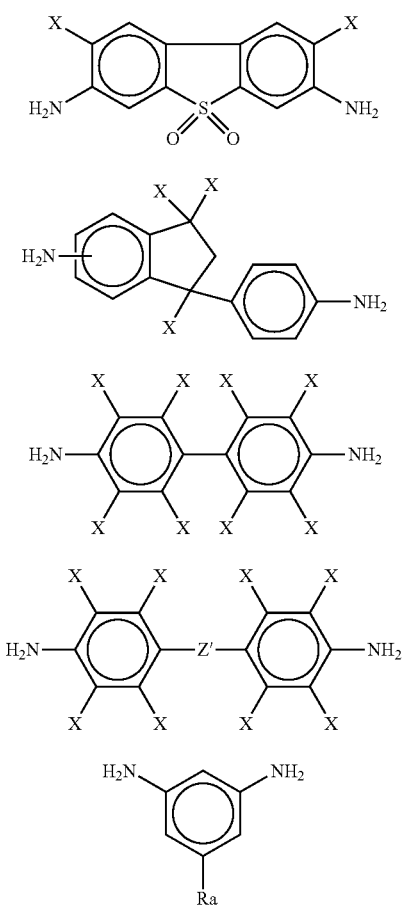

Typically, the balance of the diamine is 3,5-diaminobenzoic acid (DABA), 2,4,6-trimethyl-m-phenylene diamine (DAM), or tetramethyl-p-dianiline (DAD).

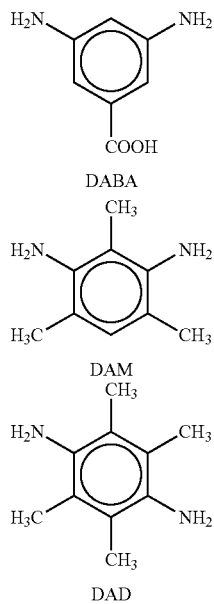

More typical polyimides include 6FDA/DETDA, 6FDA: BPDA/DETDA (polymerized using DETDA and a mixture of 6FDA and BPDA), 6FDA/DETDA:DABA (polymerized with 6FDA and a mixture of DETDA and DABA), 6FDA: BTDA/DETDA (polymerized with DETDA and a mixture of 6FDA and BTDA), 6FDA/DETDA:DAM (polymerized with 6FDA and a mixture of DETDA and DAM), or 6FDA/DETDA:DAD (polymerized with 6FDA and a mixture of DETDA and DAD).

While the membrane may have any configuration known in the field of gas separation, typically it is formed as a flat film or as a plurality of hollow fibers. In either case and before formation of the precursor membrane, the polyimide is optionally dried and later dissolved in a suitable solvent to provide a precursor solution.

The drying may be carried out in, for example, a drying vacuum oven, typically at a temperature ranging from 110-150° C. for at least 6 hours (and as much as 6-12 hours). Drying is considered to be completed once a steady weight is achieved. Other known methods of drying such as heating in an inert gas purge may additionally or alternatively be employed.

Dissolution in, and homogenous distribution of, the polymide in the solvent may be enhanced by mixing with any known mixing device, including rollers, stirrer bars, and impellers. In the case of dense films, a mixing time of at least 6 hours or as much as 6-24 hours will help to achieve homogeneity, which may help to reduce or eliminate defects in the precursor membrane. In the case of a hollow fiber precursor membrane, the precursor solution may be mixed for a longer period of time, such as 6 hours to 30 days (optionally 3-10 days or even 3-7 days).

The concentration of the polyimide in the precursor solution is typically driven by the configuration of the precursor polymeric membrane. For example, a concentration ranging from 2-20 wt % (or optionally from 3-15 wt % or even 3-5 wt %) by weight of the precursor solution is suitable for formation of dense films. On the other hand, a concentration ranging from 15-35 wt % (or optionally 18-30 wt % or even 22-28 wt %) is suitable for spinning hollow fibers.

Suitable solvents may include, for example, dichloromethane, tetrahydrofuran (THF), N-methyl-2-pyrrolidone (NMP), and others in which the resin is substantially soluble, and combinations thereof. For purposes herein, "substantially soluble" means that at least 98 wt % of the polymer in the solution is solubilized in the solvent. Typical solvents include N-methylpyrrolidone (NMP), N,N-dimethylacetamide (DMAC), N,N-dimethylformamide (DMF), dimethyl sulfoxide (DMSO), gamma-butyrolactone (BLO), dichloromethane, THF, glycol ethers or esters, and mixtures thereof.

In order to prepare a precursor membrane configured as a dense film, any suitable method of film preparation, such as solution casting, may be employed. A typical solution casting method employs knife casting where the polymer solution is coated on a travelling support web at a thickness set by the gap between the knife edge and the web below. The resulting polymer solution film is passed through an air gap and immersed in a suitable liquid coagulant bath to facilitate phase inversion of the dissolved polyimide and solidification of the precursor membrane structure.

In the case of a precursor membrane configured as hollow fibers, the hollow fibers may be spun by any conventional method. A typical procedure for producing hollow fibers of this invention can be broadly outlined as follows. A bore fluid is fed through an inner annular channel of spinneret designed to form a cylindrical fluid stream positioned concentrically within the fibers during extrusion of the fibers. A number of different designs for hollow fiber extrusion spinnerets known in the art may be used. Suitable embodiments of hollow-fiber spinneret designs are disclosed in U.S. Pat. No. 4,127,625 and U.S. Pat. No. 5,799,960, the entire disclosures of which are hereby incorporated by reference. The bore fluid is preferably water, but a mixture of water and an organic solvent (for example NMP) may be used as well. The precursor solution (known as a spin dope in the case of hollow fiber spinning) is fed through an outer annular channel of the spinneret so that it surrounds the bore fluid to form a nascent polymeric hollow fiber.

The diameter of the eventual solid polymeric precursor fiber is partly a function of the size of the hollow fiber spinnerets. The outside diameter of the spinneret can be from about 400 µm to about 2000 µm, with bore solution capillary-pin outside diameter from 200 µm to 1000 µm. The inside diameter of the bore solution capillary is determined by the manufacturing limits for the specific outside diameter of the pin.

The temperature of the solution during delivery to the spinneret and during spinning of the hollow fiber depends on various factors including the desired viscosity of the dispersion within the spinneret and the desired fiber properties. At higher temperature, viscosity of the dispersion will be lower, which may facilitate extrusion. At higher spinneret temperature, solvent evaporation from the surface of the nascent fiber will be higher, which will impact the degree of asymmetry or anisotropy of the fiber wall. In general, the temperature is adjusted to maintain the desired viscosity of the dispersion and the fiber wall asymmetry. Typically, the temperature is from about 20° C. to about 100° C., preferably from about 20° C. to about 60° C.

Upon extrusion from the spinneret, the nascent polymeric hollow fiber is passed through an air gap and immersed in a suitable liquid coagulant bath to facilitate phase inversion of the dissolved polyimide and solidification of the precursor fiber structure. The coagulant constitutes a non-solvent or a poor solvent for the polymer while at the same time a good solvent for the solvent within the dispersion. As a result, the solvent for the polymer is extracted from the nascent fiber causing the polymer to solidify as it is drawn through the quench bath. Suitable liquid coagulants include water (with or without a water-soluble salt) and/or alcohol with or without other organic solvents. Typically, the liquid coagulant is water.

The solidified fiber is then withdrawn from the coagulant and wound onto a rotating take-up roll, drum, spool, bobbin or other suitable conventional collection device. Before or after collection, the fiber may optionally be washed to remove any residual solvent. After collection, the fiber may optionally be dried to remove any remaining volatile material.

Other exemplary conventional processes for producing polymeric hollow fibers are disclosed in U.S. Pat. No. 5,015,270, U.S. Pat. No. 5,102,600, and Clausi, et al., (Formation of Defect-free Polylmide, Hollow Fiber Membranes for Gas Separations, Journal of Membrane Science, 167 (2000) 79-89), the entire disclosures of which are hereby incorporated by reference herein.

The completed precursor fibers have an outer diameter that typically ranges from about 150-550 µm (optionally 200-300 µm) and an inner diameter that typically ranges from 75-275 µm (optionally 100-150 µm). In some cases unusually thin walls (for example, thicknesses less than 30 µm) may be desirable to maximize productivity while maintaining desirable durability.

Once the precursor has been formed into the desired configuration (such as, for example a dense film or hollow fibers), the precursor membrane is at least partially, and optionally fully, pyrolyzed to form the final CMS membrane.

Polymeric films or fibers may then be pyrolyzed to produce CMS membranes.

In the case of polymeric films, the films are typically placed on a quartz plate, which is optionally ridged to allow for the diffusion of volatile by-products from the top and bottom of the films into the effluent stream. The quartz plate and films may then be loaded into a pyrolysis chamber.

In the case of polymeric fibers, the fibers are typically placed on the quartz plate and/or a piece of stainless steel mesh and held in place by any conventional means, e.g., by wrapping a length of bus wire around the mesh and fibers. The mesh support and fibers may then be loaded into the pyrolysis chamber. Alternatively, the fibers may be secured on one of both ends by any suitable means and placed vertically in a pyrolysis chamber.

The pyrolysis may be carried out under vacuum or in an atmosphere consisting of an inert gas having a relatively low oxygen level.

For vacuum pyrolysis, the pressure of the ambient surrounding the membrane is maintained at a pressure typically ranging from about 0.01 mm Hg to about 0.10 mm Hg or even as low as 0.05 mm Hg or lower.

Typical low-oxygen inert gas atmosphere pyrolysis methods are disclosed in US 2011/0100211. Typically, the ambient atmosphere surrounding the CMS membrane is purged with an inert gas having a relatively low oxygen concentration. By selecting a particular oxygen concentration (i.e., through selection of an appropriate low-oxygen inert purge gas) or by controlling the oxygen concentration of the pyrolysis atmosphere, the gas separation performance properties of the resulting CMS membrane may be controlled or tuned. While any inert gas in the field of polymeric pyrolysis may be utilized as a purge gas during pyrolysis, suitable inert gases include argon, nitrogen, helium, and mixtures thereof. The ambient atmosphere surrounding the CMS membrane may be purged with an amount of inert purge gas sufficient to achieve the desired oxygen concentration or the pyrolysis chamber may instead be continuously purged. While the oxygen concentration, either of the ambient atmosphere surrounding the CMS membrane in the pyrolysis chamber or in the inert gas is less than about 50 ppm, it is typically less than 40 ppm or even as low as about 8 ppm, 7 ppm, or 4 ppm.

While the pyrolysis temperature may range from 500-1,000° C., typically it is between about 450-800° C. As two particular examples, the pyrolysis temperature may be 1,000° C. or more or it may be maintained between about 500-550° C. The pyrolysis includes at least one ramp step whereby the temperature is raised over a period of time from an initial temperature to a predetermined temperature at which the polymer is pyrolyzed and carbonized. The ramp rate may be constant or follow a curve. The pyrolysis may optionally include one or more pyrolysis soak steps (i.e., the pyrolysis temperature may be maintained at a particular level for a set period of time) in which case the soak period is typically between about 1-10 hours or optionally from about 2-8 or 4-6 hours.

An illustrative heating protocol may include starting at a first set point (i.e., the initial temperature) of about 50° C., then heating to a second set point of about 250° C. at a rate of about 3.3° C. per minute, then heating to a third set point of about 535° C. at a rate of about 3.85° C. per minute, and then a fourth set point of about 550° C. at a rate of about 0.25 degrees centigrade per minute. The fourth set point is then optionally maintained for the determined soak time. After the heating cycle is complete, the system is typically allowed to cool while still under vacuum or in the controlled atmosphere provided by purging with the low oxygen inert purge gas.

Another illustrative heating protocol (for final temperatures up to 550° C. has the following sequence: 1) ramp rate of 13.3° C./min from 50° C. to 250° C.; 2) ramp rate of 3.85° C./min from 250° C. to 15° C. below the final temperature ($T_{max}$); 3) ramp rate of 0.25° C./min from $T_{max}$–15° C. to $T_{max}$; 4) soak for 2 h at $T_{max}$.

Yet another illustrative heating protocol (for final temperatures of greater than 550° C. and no more than 800° C. has the following sequence: 1) ramp rate of 13.3° C./min from 50° C. to 250° C.; 2) ramp rate of 0.25° C./min from 250° C. to 535° C.; 3) ramp rate of 3.85° C./min from 535° C. to 550° C.; 4) ramp rate of 3.85° C./min from 550° C. to 15° C. below the final temperature $T_{max}$; 5) ramp rate of 0.25° C./min from 15° C. below the final temperature $T_{max}$ to $T_{max}$; 6) soak for 2 h at $T_{max}$.

Still another heating protocol is disclosed by U.S. Pat. No. 6,565,631. Its disclosure is incorporated herein by reference.

After the heating protocol is complete, the membrane is allowed to cool in place to at least 40° C. while still under vacuum or in the inert gas environment.

While any known device for pyrolyzing the membrane may be used, typically, the pyrolysis equipment includes a quartz tube within a furnace whose temperature is controlled with a temperature controller.

In case the pyrolysis is carried out under a vacuum, the ends of the quartz tube to seal the tube to reduce any leaks. In vacuum pyrolysis, a vacuum pump is used in conjunction with a liquid nitrogen trap to prevent any back diffusion of oil vapor from the pump and also a pressure transducer for monitoring the level of vacuum within the quartz tube.

While the source of inert gas may already have been doped with oxygen to achieve a predetermined oxygen concentration, an oxygen-containing gas such as air or pure oxygen may be added to a line extending between the source of Inert gas and the furnace via a valve such as a micro needle valve. In this manner, the oxygen-containing gas can be added directly to the flow of inert gas to the quartz tube. The flow rate of the gas may be controlled with a mass flow controller and optionally confirmed with a bubble flow meter before and after each pyrolysis process. Any oxygen analyzer suitable for measuring relatively low oxygen concentrations may be integrated with the system to monitor the oxygen concentration in the quartz tube and/or the furnace during the pyrolysis process. Between pyrolysis processes, the quartz tube and plate may optionally be rinsed with acetone and baked in air at 800° C. to remove any deposited materials which could affect consecutive pyrolyses.

Following the pyrolysis step and allowing for any sufficient cooling, the CMS membranes may be loaded or assembled into any convenient type of separation unit. For example, flat-sheet membranes can be stacked in plate-and-frame modules or wound in spiral-wound modules. Spiral wound modules are made by winding several folded flat sheets around a central permeate tube and sealing the exposed edges with an epoxy or polyurethane adhesive. Plate and frame modules use gaskets to seal membrane sheets between feed- and permeate-side spacer plates. Hollow-fiber membranes are typically potted with a thermoset resin in cylindrical housings. The final membrane separation unit can comprise one or more membrane modules. These can be housed individually in pressure vessels or multiple modules can be mounted together in a common housing of appropriate diameter and length.

If CMS fibers are used, a suitable plurality of bundled pyrolyzed fibers forms a separation unit. The number of fibers bundled together will depend on fiber diameters, lengths, and on desired throughput, equipment costs, and other engineering considerations understood by those of ordinary skill in the art. The fibers may be held together by any means known in the field. This assembly is typically disposed inside a pressure vessel such that one end of the fiber assembly extends to one end of the pressure vessel and the opposite end of the fiber assembly extends to the opposite end of the pressure vessel. The fiber assembly is then fixably or removably affixed to the pressure vessel by any conventional method (e.g., tubesheet(s)) to form a pressure tight seal.

For industrial use, a permeation cell or module made using either pyrolyzed film or fibers may be operated, as described in U.S. Pat. No. 6,565,631, e.g., as a shell-tube heat exchanger, where the feed is passed to either the shell or tube side at one end of the assembly and the product is removed from the other end. For maximizing high pressure performance, the feed is advantageously fed to the shell side of the assembly at a pressure of greater than about 10 bar, and alternatively at a pressure of greater than about 40 bar. The feed may be any gas having a component to be separated, such as a natural gas feed containing an acid gas such as $CO_2$ or air or a mixture of an olefin and paraffin.

The described preparation of CMS membranes leads to an almost pure carbon material. Such materials are believed to have a highly aromatic structure comprising disordered $sp^2$ hybridized carbon sheet, a so-called "turbostratic" structure. The structure can be envisioned to comprise roughly parallel layers of condensed hexagonal rings with no long range three-dimensional crystalline order. Pores are formed from packing imperfections between microcrystalline regions in the material and their structure in CMS membranes is known to be slit-like. The CMS membrane typically exhibits a bimodal pore size distribution of micropores and ultramicropores—a morphology which is known to be responsible for the molecular sieving gas separation process.

The micropores are believed to provide adsorption sites, and ultramicropores are believed to act as molecular sieve sites. The ultramicropores are believed to be created at "kinks" in the carbon sheet, or from the edge of a carbon sheet. These sites have more reactive unpaired sigma electrons prone to oxidation than other sites in the membrane. Based on this fact, it is believed that by tuning the amount of oxygen exposure, the size of selective pore windows can be tuned. It is also believed that tuning oxygen exposure results in oxygen chemisorption process on the edge of the selective pore windows. US 2011/0100211 discloses typical conditions for tuning the amount of oxygen exposure. The pyrolysis temperature can also be tuned in conjunction with tuning the amount of oxygen exposure. It is believed that lowering pyrolysis temperature produces a more open CMS structure. This can, therefore, make the doping process more effective in terms of increasing selectivity for challenging gas separations for intrinsically permeable polymer precursors. Therefore, by controlling the pyrolysis temperature and the concentration of oxygen one can tune oxygen doping and, therefore, gas separation performance. In general, more oxygen and higher temperature leads to smaller pores.

Higher temperatures generally cause the formation of smaller micro and ultramicropores, while more oxygen generally causes the formation of small selective ultramicropores without having a significant impact on the larger micropores into which gases are absorbed.

EXAMPLES

Polymer Synthesis

Each of the following polyimides were synthesized: 6FDA/DETDA, 6FDA:BPDA(1:1)/DETDA, and 6FDA/DETDA:DABA(3:2). Synthesis of the polyimide polymers was a two-step process. In the first step, a high molecular weight polyamic acid (PAA) was produced by reaction of stoichiometric amounts of dianhydride and diamine monomers (dissolved in NMP (N-Methyl-2-pyrrolidone) with a solids content of 20 wt %) under $N_2$ purging and stirring for 24 hours at low temperature (~5° C.) to minimize undesirable side reactions. In step two, the ring was closed by releasing water (i.e., imidization), resulting in a chemically stable polyimide. More particularly, these was carried out at room temperature by adding beta picoline and acetic anhydride to the PAA. The resulting polyimide was precipitated and washed with methanol and dried for 24 hours at 210° C. under vacuum to provide a polyimide powder.

Polymer and CMS Film Formation:

Before dissolving the polyimide powder to form a 3-5% polymer solution (in dichloromethane (DCM), tetrahydrofuran (THF) or NMP as the case may be), it was put in a vacuum oven for at least 12 hours at 120° C. to remove moisture and residual solvent. The 3-5% polymer solution was then put on a roller with the desired casting solvent for about 6 hours to form a homogeneous solution. Polymer dense films were prepared from a homogeneous solution by a Teflon® disk casting method. Depending upon the solvent selected, the experimental set up differed. For the more volatile solvents, DCM and THF, the film casting was completed inside a glovebag (Cole Parmer) at room temperature after 3-4 days. For the low volatile solvent, NMP, a hot plate was used to accelerate the evaporation rate. The temperature of the hot plate was controlled to about 50° C. Before testing, the dense film was thermally annealed at a temperature beyond 100° C. and near the boiling point of the solvent. The annealing temperatures used for dense films derived from DCM, THF, and NMP were 120° C., 150° C., and 210° C., respectively.

CMS dense film membranes were formed by pyrolyzing precursor polymer films. Dried polymer films were first cut into small disks and placed on a quartz plate which was ridged to allow for the diffusion of by-products. The pyrolysis protocol was as follows: 1) 50-250° C. at a ramp rate of 13.3° C./min, 2) 250° C.-535° C. ($T_{max}$–15) at a ramp rate of 3.85° C./min, 3) 535° C.-550° C. at a ramp rate of 0.25° C./min, and 4) soak for 2 hours at 550° C.

Characterization Techniques:

In order to better understand the thermal behavior and stability of the polymers and whether the imidization step was successful, some characterization work was done.

Fourier transform infrared spectroscopy (FTIR) was done using a Bruker Tensor 27 FTIR spectrometer. For polymer powder, a Harrick MVP2 micro ATR with 512 scans was used.

Thermal stability and polymer degradation during the heating were investigated using a thermogravimetric analyzer (TGA: Q5000, TA Instrument) under a $N_2$ inert atmosphere at a heating rate of 10° C./min. The maximum temperature was 900° C.

A differential scanning calorimeter (DSC) (TA Q200) was used to measure the glass-rubber transition temperature of polymers. The heating and cooling rates were 10° C./min. The sample was first heated to 420° C. (a temperature beyond its expected glass transition temperature but below its decomposition temperature determined from TGA) and then cooled down to –50° C. before another heating cycle was done. The double heating cycle eliminated the effects of heat history of the materials. The transition temperature was taken to be the inflection point of the change in the heat flow during the second heating cycle.

Wide-angle X-ray diffraction (WXAD) was used to study the average d-spacing in both the polymers and carbons produced by pyrolysis. A Phillips Panalytical X-ray diffractometer with a CuKα radiation of wavelength 1.54 Å was used. The measurement angle was from 5-50 degree. Bragg's law $d=\lambda/2 \sin \theta$ was applied here.

Thermal gravimetric analysis combined with Fourier transform infrared spectroscopy (TGAIR) was performed to analyze the decomposition process and components of polymers during pyrolysis.

X-ray photoelectron spectroscopy (XPS) is a quantitative spectroscopic technique that measures the elemental composition in the surface of a material in order to obtain insightful surface morphology information for the polymer thin films.

Polymer Characterization:

Although all the polyimides tested were 6FDA and DETDA based, they differed physically, in particular, in color, texture, probably fractional free volume, and most importantly, solubility.

Attenuated Total Reflectance Fourier Transform Infrared Spectroscopy (ATR-IR) was used to confirm the imidization of polyamic acid and to determine the chemical structures of the 4 polymers. Amide groups in polyamic acids have characteristic peaks at 1660 $cm^{-1}$ and 1550 $cm^{-1}$ corresponding to the carbonyl (CONH) and C—NH groups. After the imidization process, the peak at 1550 $cm^{-1}$ disappeared as the N—H groups disappeared. In the meantime, the absorption band at 1660 $cm^{-1}$ transformed into two characteristic bands at 1780 $cm^{-1}$ and 1730 $cm^{-1}$ of the imide C=O stretching linkage. These peaks clearly indicated the existence of imide groups and confirmed the success of the imidization process.

The weight variations of 4 polymers during the heating process were examined by TGA. The temperature was first heated up to 150° C. and kept isothermally for 15 minutes to remove the moisture, and then it was dropped down to 90° C. and again reheated all the way up to 900° C. The data reveal that, except for polymer 6FDA/DETDA:DABA(3:2), from room temperature to about 400° C., the polymers lost only 2% of their original weight. This loss was mainly due to the removal of absorbed moisture and residual solvent. For 6FDA/DETDA:DABA(3:2), a peak was observed around 420° C. Former researchers have proved that this peak was due to the loss of the —COOH group in DABA, leading to crosslinking. With the temperature continuing to increase to above 490° C., the polymer backbones began to degrade, as a result, the weight loss increased abruptly.

The degradation temperatures $T_d$ (defined here as the temperature where 5% of the original weight after rigorous drying has lost) and the final percent weight loss of the 4 polymers are listed in Table 3. The data revealed that 6FDA/1,5-ND:ODA(1:1) exhibited the highest thermal stability ($T_{d=520}°$ C.) and 6FDA:BPDA(1:1)/DETDA the highest residual weight percent (58%).

Differential scanning calorimetry was applied to measure the glass-rubber transition temperature of polymers. The $T_g$ is related to the flexibility, packing and mobility of polymer chain segments, and a higher $T_g$ demonstrates higher backbone rigidity. Taking the inflection point of the change in the heat flow as the glass transitional temperature, the $T_g$s of the four polymers are listed in Table 1, which are in consistent with the results reported in literatures concerning about polyimides.

TABLE 1

Degradation temperature and % weight loss of polymers during heating

| Polymer | Weight loss % | $T_d$ (° C.) | $T_g$ (° C.) | $\Delta = T_d - T_g$ (° C.) |
|---|---|---|---|---|
| 6FDA-DETDA | 45 | 495 | 378 | 117 |
| 6FDA:BPDA(1:1)/DETDA | 42 | 505 | 401 | 104 |
| 6FDA/DETDA:DABA(3:2) | 47 | 470 | 388 | 82 |
| 6FDA:BPDA/DAM | — | 492 | 424 | 68 |

Defect-free hollow fibers with high gas permeability and selectivity have to be successfully spun prior to practical application of CMS membrane. During the intense thermal treatment, the hollow fiber substructure might collapse when temperature exceeds the Tg of the precursor polymer. This is because at glass transition, thermal energy is sufficient to overcome steric hindrance and as a result, increasing the chain mobility. The substructure collapse is undesirable in hollow fiber application because it tends to increase separation layer thickness and decrease permeance. As a consequence, a polymer with a relatively smaller $\Delta$ (defined as the difference between $T_d$ and $T_g$) is favored as a precursor for a hollow fiber. The currently widely studied hollow fiber precursor 6FDA:BPDA/DAM has a $\Delta$ of 68° C. From this perspective, 6FDA/DETDA:DABA(3:2) with a $\Delta$ of 82° C. is an interesting choice for hollow fiber formation.

WAXD was used to study the average d-spacing in both the polymer precursors and carbons produced by pyrolysis. The d-spacing reflects the average spacing between the chain centers in the molecular matrix. The results can quantitatively represent the ordered dimensions and inter-chain spacing of the materials. Bragg's law $d=\lambda/2 \sin \theta$ is applied here, where d is the d-spacing and $\lambda$ is the wavelength that has been applied in the XRD equipment (here 1.54 Å).

The following conclusions were drawn from the data. First, the WAXD technique verified the amorphous nature of these materials since the peaks were quite broad, which was also the reason why CMS materials were challenging to characterize. Second, d-spacings of polymer powders of 6FDA-DETDA, 6FDA:BPDA(1:1)/DETDA, and 6FDA/DETDA:DABA(3:2) were 6.6 Å, 6.9 Å, 6.1 Å and 5.8 Å respectively, which became 4.2 Å. 4.3 Å, and 4.3 Å (which were all in the size range of penetrants used in this study: $CO_2/CH_4$, $O_2/N_2$) after transformation to CMS. This might imply that, after pyrolysis, the material structures became denser. However, the d-spacings of CMS films do not correlate with CMS permeability well. In fact, the average intersegmental spacing may not be representative of the morphology in the rigid carbon, which has micropores and ultramicropores. The average space between "space filling" model of chains is not equal to d-spacing, which is the center-to-center distance and has a lot of electron density filling in the "space", so the d-spacing is only a rough estimate of free volume.

Removal of Residual NMP Solvent in the Polymer Film:

Due to the different solubilities of the polymers, the solvents used to cast the films were different. For polymers 6FDA-DETDA and 6FDA:BPDA(1:1)/DETDA, the solvent involved was DCM. Since the boiling point of DCM under atmospheric pressure is 39.6° C., an annealing temperature of 120° C. (proven by former researchers to be able to remove most of the DCM) was used. While for 6FDA/DETDA:DABA(3:2), it was not soluble in DCM. As a result, THF and especially NMP, whose boiling points are 66° C. and 205° C. respectively, were chosen as the solvents.

Separation performance for pure gas pairs $CO_2/CH_4$ and $O_2/N_2$:

The most important characteristics for separation films are their permeability and selectivity for specific gases. Thus, the permeability and selectivity for pure gas pairs $CO_2/CH_4$ and $O_2/N_2$ of polymeric and CMS films derived from 6FDA-DETDA, 6FDA:BPDA(1:1)/DETDA, and 6FDA/DETDA:DABA(3:2) were tested. The testing was conducted at 35° C. and 30 psi. The testing for CMS films was conducted right after the films were pyrolyzed to the maximum temperature of 550° C.

The summarized separation performance of these 3 polymers is listed in Table 2. From this table, the following conclusions can be drawn. After pyrolysis, the separation performance of the resulting CMS films was improved greatly. Both permeability and selectivity increased dramatically for all pure gases. The order of gas permeability of the resulting CMS films was: 6FDA/DETDA:DABA(3:2)>6FDA:BPDA(1:1)/DETDA>6FDA/DETDA. The order of gas selectivity of the resulting CMS films was: 6FDA/DETDA:DABA(3:2)>6FDA/DETDA>6FDA:BPDA(1:1).

TABLE 2

The permeability and selectivity for pure gas pairs $CO_2/CH_4$ and $O_2/N_2$ of polymer and CMS films derived from 6FDADETDA, 6FDA:BPDA(1:1)/DETDA, and 6FDA/DETDA:DABA(3:2) at 35° C., 30 psi

| Polymer | | $P_{CO2}$ (Barrer) | $P_{CO2}/P_{CH4}$ | $P_{O2}$ (Barrer) | $P_{O2}/P_{N2}$ |
|---|---|---|---|---|---|
| 6FDA/DETDA | precursor | 354.5 | 19 | 76 | 3.5 |
| | CMS-1 | 2735 | 48 | 641 | 7 |
| | CMS-2 | 2822 | 45.2 | 685 | 7.7 |
| | CMS-avg | 2778 | 46.6 | 663 | 7.4 |
| 6FDA:BPDA(1:1)/DETDA | precursor | 592 | 14 | 107 | 3.8 |
| | CMS-1 | 4663 | 24 | 1074 | 4.7 |
| | CMS-2 | 5893 | 26.5 | 1244 | 5.1 |
| | CMS-avg | 5278 | 24.2 | 1159 | 4.9 |
| 6FDA/DETDA:DABA(3:2) | precursor | 253 | 25 | 58 | 4 |
| | CMS-1* | 22680 | 33 | 4340 | 4.8 |
| | CMS-2* | 19616 | 32 | 3793 | 4.7 |
| | CMS-3* | 24283 | 30 | 4507 | 4.3 |
| | CMS-avg* | 22193 | 31.7 | 4213 | 4.6 |

*data from an initial CMS film of 6FDA/DETDA:DABA(3:2) was discarded as unreliable because the permeabilities and selectivities were not reproducible as were those of the CMS-1, CMS-2, and CMS-3 films.

Among these 4 types of CMS dense films, those derived from 6FDA:BPDA(1:1)/DETDA were expected to exhibit the smallest permeability and the highest selectivity since they were expected to have a somewhat flexible polymer backbone structure and a longer alkyl group on the diamine that might favor chain packing. However, the results showed 6FDA/DETDA dense films had the lowest permeability.

Interestingly, CMS films derived from 6FDA/DETDA:DABA(3:2) possessed unusually high permeability and high selectivity compared with the previously tested 6FDA: BPDA(1:1)/DAM CMS membranes, which showed permeability for $CO_2$ and $O_2$ as 7170 and 1530 Barrer, and selectivity for $CO_2/CH_4$ and $O_2/N_2$ as 30 and 7.5. Without being bound by any particular theory, one possible reason might be the underlying coexisting rigidity and flexibility of the polymer backbones. 6FDA/DETDA:DABA(3:2), itself, has a relatively flexible backbone, but the carboxylic group in DABA provides a crosslinking position which also appears to impact the CMS properties compared to the DABA-free precursor case.

Next, as mentioned previously, all polymer films are subject to a so-called trade-off curve. It was of interest to examine whether the CMS materials were able to surpass this limitation.

FIG. 1 graphically displays the separation performance of polymer and CMS films at 35° C. and 30 psi derived from:
a) 6FDA/DETDA represented by □, ■;
b) 6FDA:BPDA(1:1)/DETDA represented by ○, ●;
c) 6FDA/1,5-ND:ODA(1:1) represented by △, ▲; and
d) 6FDA/DETDA:DABA(3:2) represented by open star, closed star;
where the open symbols represent polymer films and solid symbols represent CMS films. As presented in FIG. 1, the separation performance of polymer films was all below the upper bounds for both $O_2/N_2$, $CO_2/CH_4$ separations, as expected. After pyrolysis, performance of the resulting CMS films improved greatly. Both permeability and selectivity increased. More importantly, it had been brought beyond the upper bound.

Figure 2:
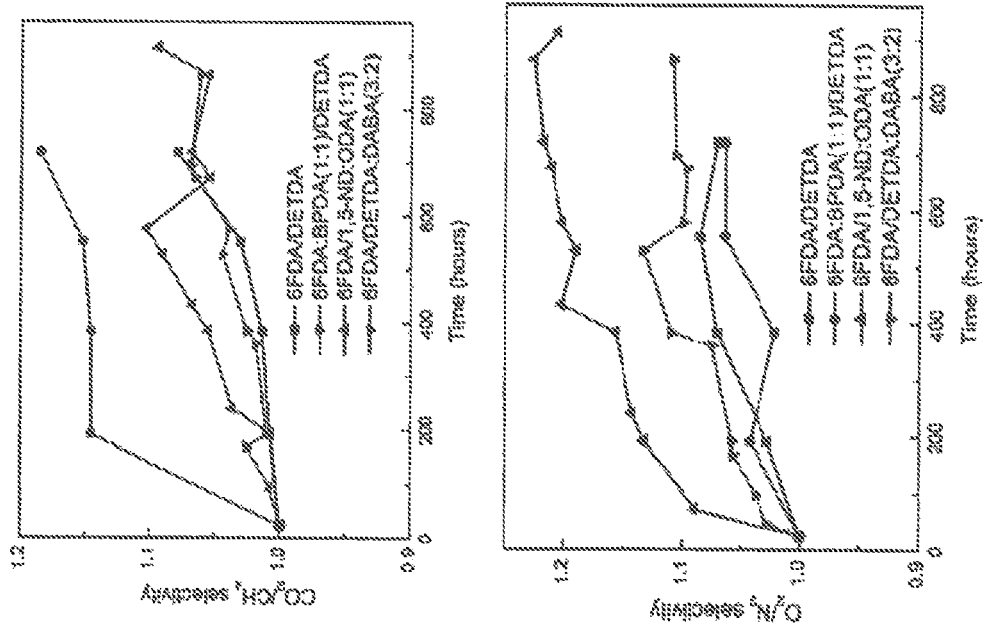
Figure 2:
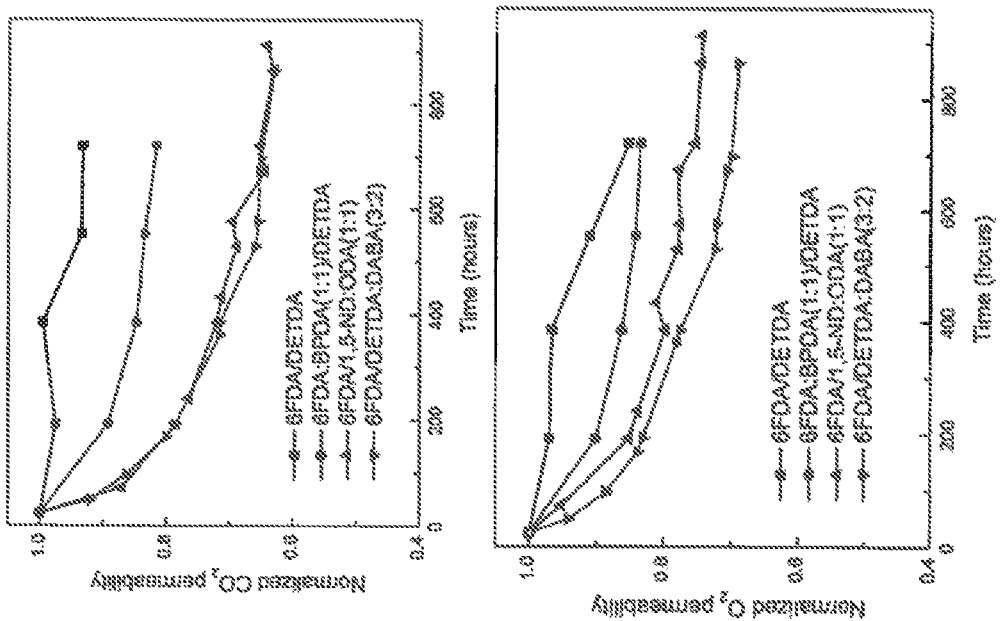

Physical Aging Study for Pure Gases:

The permeability and selectivity for $O_2/N_2$, $CO_2/CH_4$ of the CMS films derived from all 3 polymers were studied during the films being soaked under vacuum for about a month at 35° C. During test intervals, the films were kept under vacuum. Using the same closed graphical symbols from FIG. 1, FIG. 2 shows the time dependence of the gas permeability and selectivity. The data in Table 2 were those tested after one day.

It is obvious that as time increased, the permeability for the gases in the CMS films derived from the 3 polymers showed a decreasing trend and the selectivity showed an increasing trend. The changing rate was the highest in the first testing day, which was as expected since at the beginning, the free volume of the material was the largest.

After 4 weeks, for CMS films derived from 6FDA/DETDA, the total changes of permeability for all gases were less than 15%, and for selectivity less than 10%. For films derived from 6FDA:BPDA(1:1)/DETDA, the largest permeability decrease was 30% for $CH_4$, and the selectivity changes held within 20%. Carbon films derived from 6FDA/DETDA:DABA(3:2) showed more aging: their permeability changes for the gases were all beyond 25%.

Aging Study for Mixed Gases:

To further examine the nature of the CMS films, the permeability for relatively larger molecules $C_3H_6$ and $C_3H_8$ in 6FDA/DETDA carbon films was tested—using a feed gas composition of propane to propylene 50:50. The permeability and selectivity for $C_3H_6/C_3H_8$ (50:50) of 6FDA-DETDA CMS film were studied during time the film was stored under vacuum for 25 days at 35° C. FIG. 2 shows the time dependence of the gas permeability and selectivity.

Compared with small pure gases, the changes of permeability and selectivity for $C_3H_6/C_3H_8$ (50:50) were more apparent. This is particularly noteworthy, since the 6FDA/DETDA sample showed only moderate aging for $O_2/N_2$, $CO_2/CH_4$ systems in FIG. 2. The permeability for both propane and propylene decreased to about 50% of the initial value after 25 days under vacuum. The $C_3H_6/C_3H_8$ selectivity first increased from 63.0 to 75.6 (about +25%) after 14 days but then dropped to 70.9 after another week. This demonstrated that for larger gas molecules, 6FDA/DETDA CMS film showed more physical aging. Again, the detailed fundamental cause of this more extensive aging tendency as observed by the larger gaseous is unclear at this point; however, it is expected to reflect changes in the ultramicropore and micropore population.

As a comparison point, for the smaller $C_2H_4/C_2H_6$ pair in mixture gas studies, Rungta found more aging in 6FDA-DAM derived CMS (Rungta, Carbon molecular sieve dense film membranes for ethylene/ethane separations, Georgia Institute of Technology, PhD thesis, 2010). While experimental differences exist between the Rungta work and this Example, the Rungta results showed that the permeability for $C_2H_4$ in CMS dense film derived from 6FDA-DAM dropped more than 90% after about 30 days, and $C_2H_4/C_2H_6$ selectivity increased to about 3 times the initial value during the same period of time.

Separations of $C_3H_6/C_3H_8$ mixtures in CMS membranes derived from 6FDA/BPDA-DAM have been studied thoroughly. That earlier work determined that the $C_3H_6/C_3H_6$ selectivity of carbon material pyrolyzed to 550° C. with a 2 hour thermal soaking was less than 40 and the permeability of $C_3H_6$ is about 26 Barrer. Moreover, $C_3H_6/C_3H_8$ selectivity was still less than 50 when elongating the soaking time to 8 hours, and the permeability of $C_3H_6$ decreased to about 19 Barer. With respect to this Example, even after 600 hours of aging, 6FDA/DETDA CMS films showed permeability for $C_3H_6$ higher than 100 barrer and selectivity for $C_3H_6/C_3H_8$ higher than 60. From this perspective, 6FDA-DETDA is a truly exciting material for C3 mixture separations.

CONCLUSIONS

6FDA-DETDA and 6FDA:BPDA(1:1)/DETDA CMS membranes appear to possess an attractive anti-aging ability. 6FDA/DETDA:DABA(3:2) has high permeability and selectivity. Considering the separation performance, 6FDA/DETDA:DABA(3:2) shows great potential. Finally, the relatively small $T_d$-$T_g$ of 6FDA/DETDA:DABA(3:2) makes it favorable for formation of hollow fibers.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for producing a carbon molecular sieve (CMS) membrane, comprising the steps of forming films or hollow fibers made of a polyimide polymer or copolymer to produce a precursor membrane, and pyrolyzing the precursor membrane under conditions sufficient to form a CMS membrane, wherein:

the polyimide polymer or copolymer essentially consisting of repeating units of dianhydride-derived units and diamine-derived units;

each dianhydride-derived unit being the dianhydride-derived moiety of formula (I):

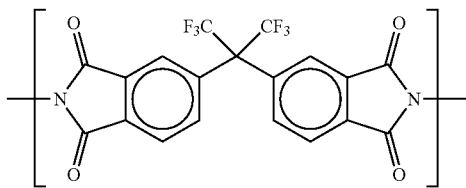

at least 50% but not all of the diamine-derived units are the diamine-derived moiety of formula (A) with the balance of the diamine-derived units being the diamine-derived moiety of formula (H):

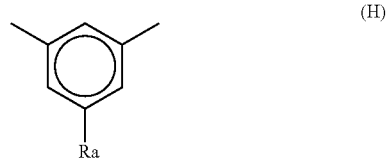

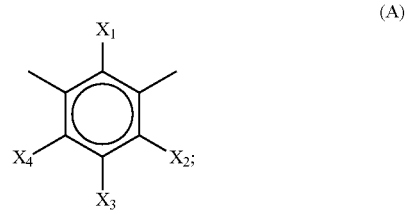

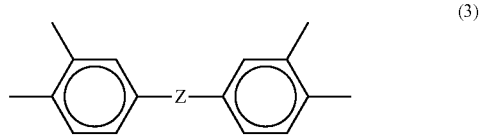

each $R_a$ is a —COOH group;
$X_1$ and $X_3$ are ethyl groups;
$X_2$ is a methyl group;
$X_4$ is H.

2. The CMS membrane made according to the method of claim 1.

* * * * *